Figure 1:
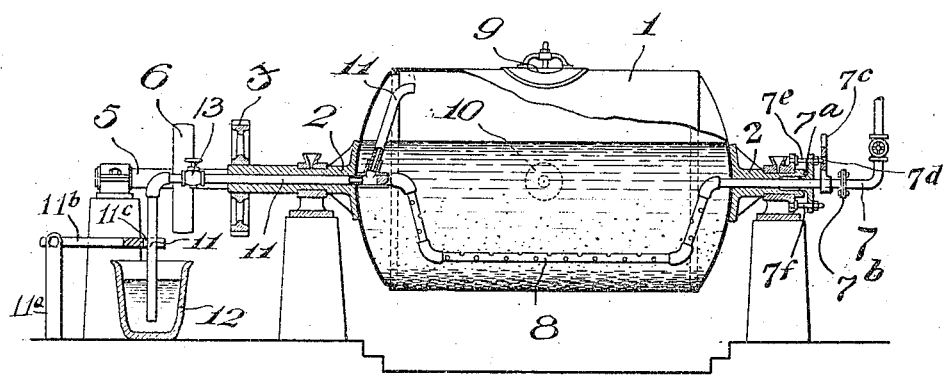

July 3, 1923.

R. TAKI 1,460,621

APPARATUS FOR MANUFACTURING LIME SULPHUR

Filed Feb. 18, 1921

Inventor.
R. Taki,
By Marks & Clerk
Attys.

Patented July 3, 1923.

1,460,621

UNITED STATES PATENT OFFICE.

ROKUJIRO TAKI, OF ABE-GUN, SHIZUOKA-KEN, JAPAN.

APPARATUS FOR MANUFACTURING LIME SULPHUR.

Application filed February 18, 1921. Serial No. 446,111.

*To all whom it may concern:*

Be it known that I, ROKUJIRO TAKI, a subject of the Empire of Japan, residing at No. 316 Shimizu-Machi, Abe-Gun, Shizuoka-Ken, Japan, have invented certain new and useful Invention of an Apparatus for Manufacturing Lime Sulphur, of which the following is a specification.

My invention relates to an apparatus for manufacturing lime sulphur comprising a horizontally disposed pressure-proof revolving tank, means for heating and agitating contents of the tank and means for discharging gases generated in the tank.

The object of the invention is to provide an apparatus of the type which can produce a thick lime sulphur easily, rapidly and mos economically.

The accompanying drawings show an example of the apparatus of the invention.

In the drawings:—

Figure 3:
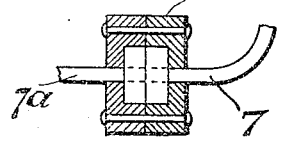
Figure 2:
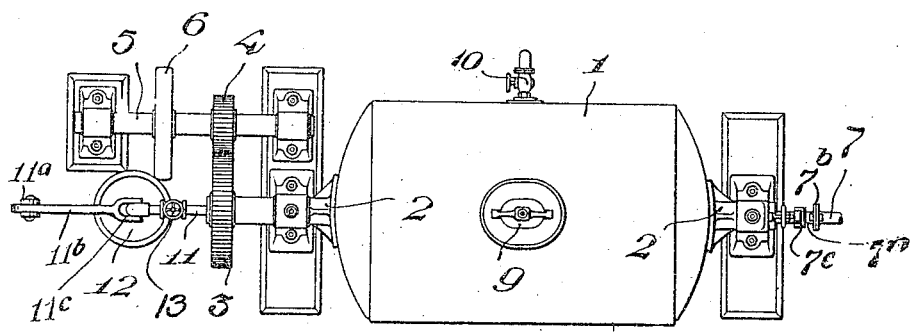

Figure 1 is a longitudinally sectioned side elevation, and Figure 2 is a plan view, of the apparatus. Figure 3 is a detail view of a swiveled joint forming part of the apparatus.

Referring to the accompanying drawings, a horizontally disposed pressure-proof tank is shown having its end walls provided with trunnions 2 which are rotatably mounted in suitable bearings. One of the trunnions is provided with a fixed gear 3 which meshes with a gear 4 fixed to a shaft 5 having a pulley 6 which may be driven from any suitable prime mover. A steam supply pipe 7 extends through one of the trunnions 2 and its portion which is arranged within the tank 1 is of substantially U-shape as shown at 8 while the extremity of the steam-pipe is closed and swiveled in the inner end of a pipe 11 which extends through the other trunnion 2. The pipes 7 and 11 are normally stationary but the pipe with its U-shaped portion 8 may be turned to cause the U-shaped portion of the pipe to assume a position diametrically opposite to that shown in Fig. 1 of the drawing. This is to avoid the sulphur and other deposits closing perforations in the U-shaped portion of the steam pipe 7 during the cooling operation of contents of the tank. In order to permit the U-shaped portion 8 of the steam pipe to be moved from the lower position which it occupies in Figure 1, to a position diametrically opposite to said position, the portion of the pipe designated 7 may be stationary or fixed while the portion 7ª is rotatably mounted in the right hand trunnion 2. With such a construction, a swiveled joint, such as shown in Figure 3 will be provided at 7ᵇ. The portion of the pipe 7ª is provided with a fixed collar carrying a resilient arm 7ᶜ having an aperture 7ᵈ designed to engage the outer ends of either of the bolts 7ᵉ or 7ᶠ. When the aperture 7ᵈ is engaging the bolt 7ᵉ, the spring arm 7ᶜ will prevent the pipe 7ª from turning, and will hold the portion 8 in the lower portion of the tank. When the arm 7ᶜ is released from the bolt 7ᵉ, said arm may be turned 180° to cause the perforated pipe 8 to occupy a position in the upper portion of the tank, and at this time the aperture 7ᵈ may be engaged with the bolt 7ᶠ for holding the perforated pipe in its upper position. The tank is provided with an opening closed by a cover 9, and a valve 10 is arranged at one side of the tank. The inner end of the pipe 11 is branched as shown and this branch extends upwardly and has its end arranged near the upper portion of the tank for the purpose of discharging gases generated within the tank. These gases are carried by the pipe 11 and discharged beneath the surface of a body of caustic-soda solution arranged within a subsidiary tank 12. A valve 13 is arranged on the pipe 11 for the purpose of adjusting the discharge of gases to maintain a proper pressure in the tank.

Suitable means may be provided for preventing movement of the pipe 11, and such a means may consist of a vertical post 11ª having a bifurcated upper end in which is pivotally mounted the outer end of a lever 11ᵇ having a forked end 11ᶜ engaging the depending portion of the pipe 11.

The operation of manufacturing lime sulphur by the apparatus is as follows:—

Calcium oxide, sulphur and water are mixed in a proper proportion and the mixture is put into the tank to fill about 70 per cent of its depth, as shown in Fig. 1. The cover 9 and the valve 13 are then closed, and then the tank is rotated while steam under a pressure of approximately 25 lbs. is introduced into the tank. The contents of the tank are thus heated under pressure, by steam and by the heat evolved by the combination of calcium oxide, the pressure in the tank being maintained at a proper degree by the adjustment of the valve 13. The contents of the tank 1 are continuously agitated by the steam jets issuing from perforations in the U-shaped portion 8 of the pipe and as the tank revolves the portion 8 of the steam pipe will act as a dasher against which the mixture is thrown. The operation above mentioned is maintained for a proper length of time and chemical action is caused between the calcium oxide and the sulphur and a thick liquid lime sulphur is produced.

The gas evolved in the tank 1 will pass off through the pipe 11 into the caustic-soda solution contained in the tank 12. The sulphureted hydrogen produced during the above process and discharged through the pipe 11 will be led into the caustic soda tank to secure sodium sulphide as a by-product. Thus sodium sulphide is economically produced and the passage of the sulphureted hydrogen into the caustic-soda avoids the diffusion of the offensive odor generated within the tank.

When the chemical action in the tank is nearly completed, steam is cut off, the rotation of the tank is discontinued, and the tank and its contents are permitted to cool for a proper length of time, until the excess portion of sulphur melted during the heating, deposits in solid form upon the bottom of the tank. The lime, soil, mud, and other mixture substances, in the sulphur settle solidly in stratified relation above the excess portion of sulphur melted during the heating. When the sulphur becomes completely solidified the valve 10 is opened, and the lime sulphur is first removed, and then the mud etc. as well as the sulphur deposits are taken out.

The apparatus of this invention is especially suited for carrying out the process of manufacturing lime sulphur described in the specification of U. S. application No. 353,997, and a thick lime sulphur as, for instance, above 33° Baumé can be obtained directly in the tank easily, quickly and most economically.

I claim.

1. An apparatus for manufacturing lime sulphur comprising a horizontally disposed pressure-proof rotatable tank provided with a filling opening, a cover for said opening, trunnions fixed at both ends of said tank, means for supporting said trunnions, means for rotating said tank, a steam pipe extending through one of said trunnions and having a normally stationary U-shaped perforated portion normally arranged in the lower portion of said tank in order to discharge steam into the material beneath the level of said material, said U-shaped portion being pivotally mounted in said tank to permit said U-shaped portion to be moved to and maintained in a position at the upper portion of the tank during the rotation of the tank for cooling the contents, and a gas discharge pipe having its inner end opening into the upper portions of the interior of the tank and its outer end arranged exteriorly of the tank.

2. An apparatus as claimed in claim 1 in which the inner end of the U-shaped portion of the steam pipe is pivotally connected to the gas discharge pipe.

In testimony whereof I have affixed my signature in presence of two witnesses.

ROKUJIRO TAKI.

Witnesses:
KWAN JEHIKAWA,
NEYRON O. HOPER.